April 24, 1956
E. S. BETTIS ET AL
2,743,342
MAGNETIC ARC-WELDER
Filed April 15, 1952
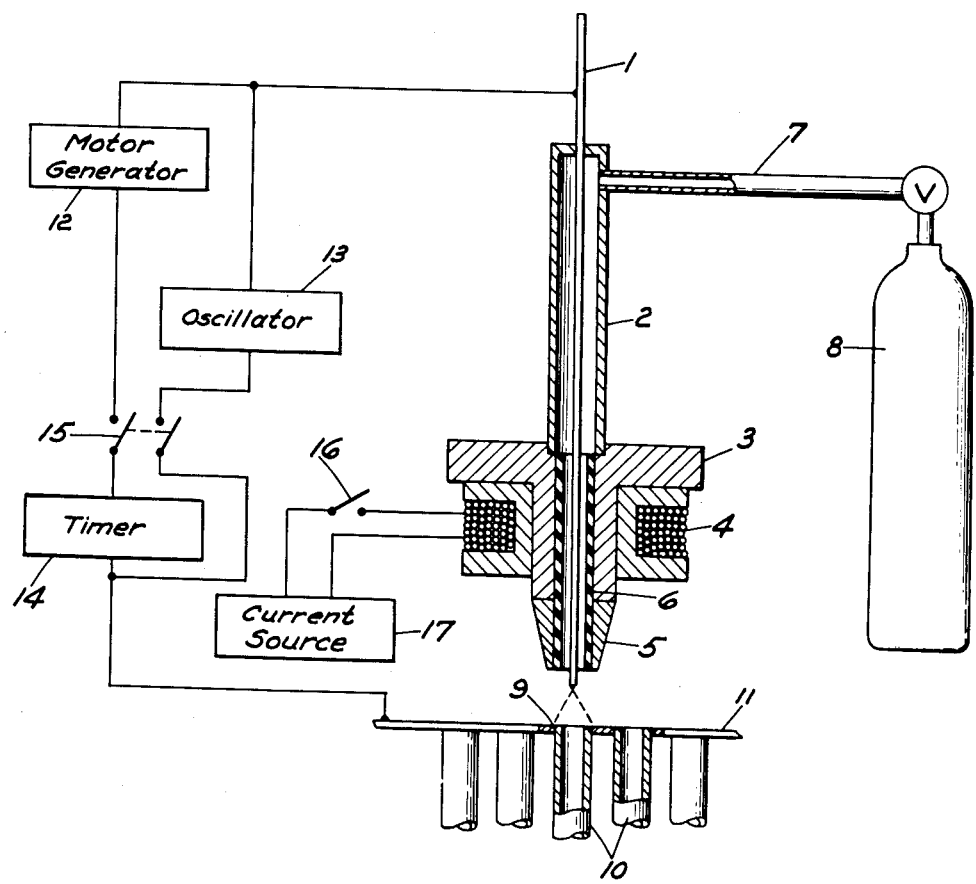
INVENTORS
Edward S. Bettis &
BY Estle R. Mann
ATTORNEY

United States Patent Office 2,743,342
Patented Apr. 24, 1956

2,743,342

MAGNETIC ARC-WELDER

Edward S. Bettis, Fountain City, and Estle R. Mann, Oak Ridge, Tenn., assignors to the United States of America as represented by the United States Atomic Energy Commission Application April 15, 1952, Serial No. 282,408

4 Claims. (Cl. 219—8)

The present invention relates to arc welding devices, and more especially to an improved method of an apparatus for making uniform circular welds which involves no moving parts to rotate the welding electrode.

In welders of the prior art, the welding electrode or torch is generally moved manually around the work piece to make a circular weld. In certain improved welders, movement of the electrode is accomplished by mechanical means. Mechanical means are generally cumbersome, and not adapted to a device which must make many small uniform welds in limited surface areas, as in a heat-exchanger header which is adapted to receive a great many small tubes. The most serious shortening of prior welders is that the circular welds they produce are not uniform or reproducible. Moreover, severe heat stress are set up throughout all the adjacent metal, including nearly welds, by application of the welding arc for sufficient time to make a uniform, tight weld. This is especially true during manual movement of the electrode about the circular path, which must be done slowly and carefully to achieve any sort of satisfactory weld. Even with most careful manual operation, it is impossible to make uniform circular welds of small diameter in a crowded area.

Moreover, in making a great many small circular welds, as in joining tubes into a header, it may be essential that the welder approach the work piece only from one side. Many welders of the prior art are not adaptable to mass production for this reason, because parts thereof must be manually connected to and disconnected from the work piece or disposed about the work piece on both sides, so that an excessive amount of time is required for their operation. This type of welder is, of course, entirely useless where a great many welds are to be made in a confined space, inaccessible except on one surface.

With a knowledge of the shortcomings of the prior art, we have devised a welder having a novel mode of operation and comprising means for suspending the welding electrode directly over and axially aligned with the center of the circular weld path desired, rather than over the circumference of the path itself; means for establishing an arc from the electrode to a point on the weld path, such that the arc is at an angle with the axis of the weld-path center and the electrode; and means for establishing a magnetic field about the arc substantially along said axis, so that the arc cuts across the magnetic lines of force in traversing its path between electrode and metal. A component of force set up by the arc crossing the lines of force will, we have found, rotate the arc extremely rapidly around the circular path desired.

We have also provided a novel method of making small, circular arc welds of tubing and the like into a header, comprising the steps of disposing a welding electrode over the center or axis of the tubing, rather than over the edge where the weld is to be made, as in the prior art, striking an arc to the edge of the tubing at an angle to its axis, and establishing a magnetic field about the arc angularly inclined to the arc, whereby the arc, in crossing the lines of magnetic force, will be repelled in a circular path about the edge of the tubing.

The arc anode may be of any desired composition and size or known to the art, such as a thoriated wolfram rod. The means for establishing a magnetic field of the character described may take the form of a permanent magnet, or may be a solenoid including a soft iron core and the necessary current-carrying windings of the type known to the art. The exact size and shape of the magnetic field about the welding rod tip may be controlled by varying the strength of the magnet, or its distance above the arc, and by providing a soft iron lower tip or end on the magnetic pole pieces, as is fully described below. Any suitable power supply means may be employed for furnishing electric current to the welding arc through the anode, such as a conventional radio-frequency exciter. The arc duration may be controlled through conventional timers which make and break the arc circuit. The magnitude of the arc current and voltage may be regulated by conventional controllers.

Since both the path and the speed of the arc are controllable with great accuracy, the heating of the metals welded can be made extremely uniform, so that the welds are reproducible. Moreover, the speed of arc rotation is so great that the surfaces near the welds are not subjected to severe heat stresses. The temperatures of points on the welded circle are brought up uniformly, so that the weld is complete all around the periphery at the same time.

Accordingly, it is an object of the present invention to provide a novel method for making small uniform circular welds of tubing and the like to an abutting surface.

A further object of the invention is to provide an improved arc welder for making small circular welds, which requires no moving parts.

Another primary object of the invention is to provide a method of and means for making uniform, tightly-bonded arc welds without causing great heat-stresses in the metals welded.

A further object is to provide a welder suitable for mass production which requires no physical contact with the parts to be welded and requires access to but one face of the surfaces to be joined.

Other objects and advantages of the present invention will become apparent from the reading of the following detailed description, in connection with the appended drawing, which illustrates a preferred embodiment of our novel arc welding device disposed over a workpiece.

Referring now to the drawing, the welding rod 1, forming the welding anode, extends axially through tubing 2 and terminates at a point above the center of the circular weld path or seam 9 which is to join tube 10 to surface 11. A flanged core 3 of soft iron surrounds a portion of rod 1, while solenoid 4 fits over the core. Soft iron tip 5 may be mounted to the lower end of core 3 to form a pole piece to shape the magnetic field at the desired angle to the axis of the electrode 1. Insulating sleeve 6 is provided within the hollow core to shield it from the high welding potential applied to the electrode 1. The necessary inert gas for the welding arc may be supplied to the inside of tube 2 through gas inlet 7 from a conventional bottle 8 of welding gas, such as helium, argon or the like.

The arc current may be supplied from a conventional D. C. motor-generator set 12. A commercially available oscillator 13 may be employed to superimpose a high-frequency voltage upon the generator output to strike the arc. A timer 14 may govern the duration or time the arc is struck, to control the heating of the welded surfaces, by opening the switch 15 after the proper time, breaking the circuit between rod 1 and header 11. Any convenient stop-start apparatus may control the overall operation, energizing the solenoid winding, starting the timer, and energizing the arc-producing and controlling elements. For clarity, separate switches 15, 16, are illustrated for that purpose. A suitable motor-generator is produced by the General Electric Company and identified as Model 6WD4200A2. A suitable timer is the Eagle Microflex Timer, distributed by the Eagle Signal Corporation. Oscillator HF-15, distributed by Miller Electric Manufacturing Company is a satisfactory oscillator.

The distance between the soft iron tip 5 and the surface of the weld path is not critical. The best operating conditions for each particular job may be determined by making test welds, and will depend upon several factors, including the welding arc current desired, the strength of the magnetic field, provided the size of the weld to be made, and the materials to be welded. For example, excellent operation is obtained if a welding arc current of 71 amperes is applied to weld a tube of stainless steel 316 having a wall .01 inch thick and .1 inch outer diameter into a plate or header of stainless steel 304, .125 inch thick. The tip may be positioned substantially .04 inch above the surface of the work. The timer may allow an arc of 1.2 seconds duration, and welds as close as .1 inch away will be unharmed. The tip 5 may be positioned about .25 inch above the tip of rod 1.

In accordance with our invention, the device is positioned with rod 1 over the center of the circular weld path. Switch 16 is closed, energizing the electromagnet 3 from source of current 17, setting up a magnetic field about the welding tip roughly parallel to the rod axis. Inert gas is admitted to tube 7 and flows through tube 2 and sleeve 6 to the welding tip. Switch 15 is closed, energizing timer 14 and oscillator 13. The oscillator produces a voltage greater than breakdown voltage for the gap between the work piece 11 and the rod 1 when such voltage is established across the gap, at an angle to the orientation of the rod, and an arc is struck. Because of the direction of the electrical field, the arc extends from the tip of the welding rod to some point on the periphery 9 of the tube 10.

The arc comprises a great many charged particles, or ions. As may be seen from the sketch of the normal direction of the arc magnetic field lines roughly parallel to the rod 1 are crossed and cut by the ion stream. Because of movement of the conducting arc across the lines of flux, a strong component of force is established perpendicular to the arc, regardless of its location about the periphery 9 at any instant. This component of force will deflect the beam in a direction perpendicular to both the direction of motion of the ions in the arc and also to the direction of the field. Therefore, the point of impact of ions upon the tube moves around the periphery of the tube in the desired circular weld path. It can be moved at an extremely high speed, depending upon the arc current and the strength of the magnetic field. Because of the very high rate of arc rotation obtainable by this component of force, we have found that the rise and fall of power delivered to individual points on the circle is so rapid that the capacity of the metals provides a smoothing effect upon the weld temperature. For this reason, wide temperature gradients between neighboring points on the work piece do not exist at any time. This desirable condition prevents high stresses in the metals at the weld, and also provides uniformity in the heat treating cycle of all metals near the weld.

A more elaborate method and apparatus for providing highest uniformity among welds in close proximity involves providing an enclosed furnace filled with an inert atmosphere, and heating the parts to be welded almost to their melting points. In this way the fusion metal in a weld reaches a temperature which is not such a wide excursion above that of the neighboring metal. Moreover, stresses on neighboring welds are well below those which exist where the metal is allowed to cool down to a wide range after each weld. In such a furnace, the inert atmosphere itself provides the source of ions for the welding arc, so that the special tubular means 2 for furnishing gas to the welding arc would not be necesasry.

Having thus described our invention, we claim:

1. A mechanism for electric circular arc welding comprising, in combination, a fusible welding electrode, a member provided with at least one circular aperture forming a work piece, means for suspending said electrode above the hollow center of said aperture, the aperture periphery forming the desired circular weld path on said work piece, an arc current source connected in series between said work piece and said electrode to strike an arc to said work piece on said path, means for supplying a gaseous source of ions for said arc, means for establishing a magnetic field concentrically about said electrode, core means for shaping said magnetic field adjacent the tip of said welding electrode to provide a strong component of said field perpendicular to the motion of ions in said arc, and electrical insulating means disposed between said electrode and said core means, said arc being rapidly rotated in said circular path by said component of said magnetic field.

2. An arc welder adapted for mass production of small circular welds on a workpiece provided with a plurality of small circular apertures comprising a fusible welding electrode, support means for said electrode; means for positioning said electrode over the hollow center of the circular weld path desired on a work piece; power supply means for striking an arc between said electrode and said work piece; means for supplying gaseous atmosphere between said work tip and said work piece including a tubular member surrounding the said electrode and communicating with a source of said gas; and means for establishing a stationary magnetic field about said work tip and said weld path having a substantial component angularly inclined to a line between said tip and any point on said path, comprising a magnetic core disposed concentrically about said electrode, a solenoid disposed about said core, D. C. current means for energizing said solenoid; said core having a tapered periphery.

3. Apparatus for welding a tubular member to a header in a circular weld when said members are accessible from only one side of the plane of said weld path comprising a conductor connected to said header member, means for holding said tubular member with one end thereof contacting said header surface along the periphery of an aperture in said header, means for holding a fusible welding electrode assembly adjacent said members above the center of the desired circular weld path, and a means for striking an arc between said electrode and the points of contact of said members, said assembly including a conduit for supplying gas to said arc and means for establishing a magnetic field between said electrode tip and said members having a substantial component angularly inclined to the arc between said tip and said points of contact, whereby said arc is caused to rotate rapidly about said weld path.

4. Apparatus for electric arc welding of tubes to a header provided with circular apertures to receive the ends of said tubes comprising a fusible welding electrode, an electrical insulator surrounding a portion of said electrode, a magnet surrounding at least a portion of said insulator, a support for said magnet, insulator and electrode, a pole piece contacting said magnet and tapered to concentrate the field produced by said magnet parallel to said electrode in the vicinity of one tip thereof, means for striking an electrical arc between said electrode and a point on said tube ends, said arc being angularly inclined to said electrode, and means for interrupting said arc.

(References on following page)

References Cited in the file of this patent

UNITED STATES PATENTS

| | | |
|---|---|---|
| 501,825 | Coffin | July 18, 1893 |
| 1,589,017 | Lincoln | June 15, 1926 |
| 1,787,600 | Strobel | Jan. 6, 1931 |
| 1,796,969 | Strobel | Mar. 17, 1931 |
| 1,851,479 | Andren | Mar. 29, 1932 |
| 1,854,536 | Wilson | Apr. 19, 1932 |
| 1,921,572 | Kinnard | Aug. 8, 1933 |
| 2,473,871 | Edels | June 21, 1949 |
| 2,475,183 | Gibson | July 5, 1949 |

FOREIGN PATENTS

| | | |
|---|---|---|
| 687,215 | France | Apr. 22, 1930 |